April 20, 1965    G. M. RAPATA    3,178,786
MOLDING CLIP
Filed Dec. 5, 1961
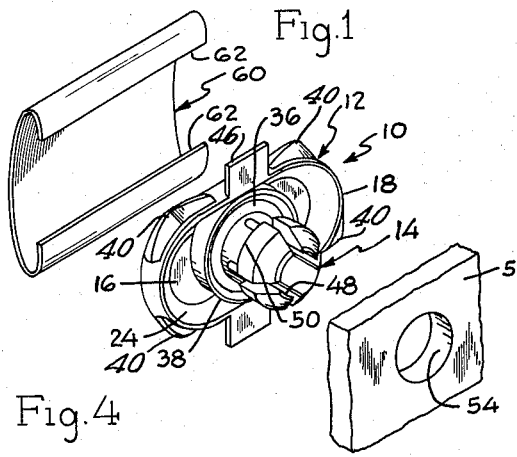
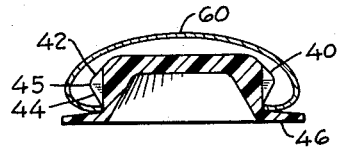
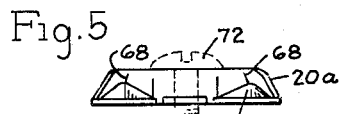
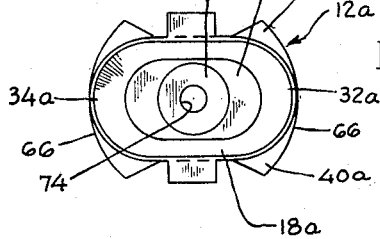
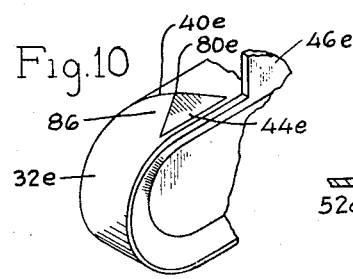
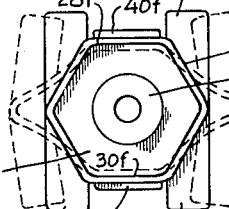
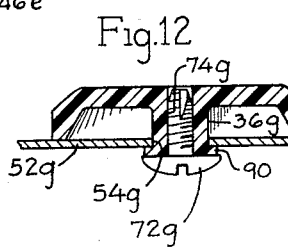
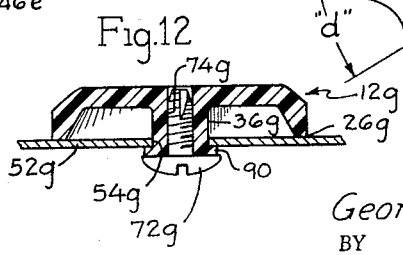
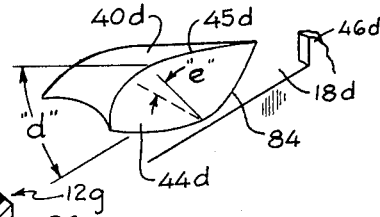
INVENTOR.
George M. Rapata
BY
ATTY.

3,178,786
MOLDING CLIP
George M. Rapata, Park Ridge, Ill., assignor to Illinois Tool Works Inc., Chicago, Ill., a corporation of Delaware
Filed Dec. 5, 1961, Ser. No. 157,054
5 Claims. (Cl. 24—73)

This invention relates to a fastener device. More particularly, it relates to a snap type molding clip which is capable of being accepted within the confines of a decorative molding having inwardly turned edges forming opposed flanges.

Further, the invention relates to a one piece plastic molding clip head which when associated with suitable stud means will retain a decorative molding adjacent an apertured support.

The prior art relating to fastener devices for retaining decorative strips on supporting panels is not only complex, but also very voluminous. While many metallic fasteners have been proposed in the past, relatively few molding clips exist which will not only retain the molding but also seal the aperture in the supporting panel. A distinct advantage of the plastic materials is that they can be fabricated into complex shapes which are suitable for retaining the clip to the panel, as well as for overcoming the sealing problem. This latter problem is brought about through the necessity of providing an aperture in the support for accepting stud means. In the metal art complex and expensive methods have been proposed to seal the inside of the support from the outside about the aperture to prevent the ingress of fluids and dirt, which tend to decompose the support panel about the aperture.

An object of the present invention is to provide a plastic molding clip head which when associated with stud means for attaching the head to a support will adequately seal the aperture through which the stud means projects from the surrounding environs as well as supporting a decorative molding strip in juxtaposition to the support.

A further object of this invention is to provide a resilient plastic molding clip head capable of accepting a variety of sizes of moldings.

Still another object of the invention is to provide an economical, efficient all plastic fastener capable of carrying out the objects set forth hereinabove.

Other objects will become apparent to those skilled in the art when the attached specification is read in conjunction with the drawing wherein:

FIG. 1 is an exploded perspective view of a preferred embodiment of the present invention;

FIG. 2 is a partial elevation of the embodiment shown in FIG. 1;

FIG. 3 is a view taken along 3—3 in FIG. 2, showing a portion of a molding in final applied position to the clip while the phantom lines disclose the position of the clip during application of the molding;

FIG. 4 is a partial sectional view taken along line 4—4 of FIG. 3;

FIG. 5 is an elevation view of another embodiment of the present invention;

FIG. 6 is a bottom view of the clip shown in FIG. 5;

FIGS. 7, 8, 9 and 10 are partial views of various modifications to the protuberance or ledge means utilized in attaching the head of the fastener to the decorative molding;

FIG. 11 is still another embodiment of the invention; and

FIG. 12 is a further embodiment of the invention showing additional means for sealing the aperture.

Molding clip 10 embodying the principles taught by this invention includes a head 12 and suitable stud means 14. The head 12, as best seen in FIGS. 1 through 4 includes an elongated, thin, substantially planar body portion 16 preferably oblong or oval in plan configuration. It is preferably formed symmetrical about a major axis "$x$" and a minor axis "$y$." Depending integrally from the periphery of body portion 16 is a substantially continuous skirt or rim 18. Rim 18 on its outer surface has upper and lower portions 20 and 22 respectively. Upper portion 20 tapers outwardly and downwardly from its juncture with body 16 while lower portion 22 is substantially vertical, as seen in the drawing. The inner surface 24 tapers outwardly and downwardly from the juncture with the underside of body 16 and terminates a short radial distance from lower portion 22 to provide a thin sealing surface 26 which is substantially continuous about the periphery of the clip. The thinning out of rim 18 to a sealing surface 26 provides strength and controlled resiliency in the head. In the preferred embodiment, the rim 18 is provided with two flat sides 28 and 30 respectively which parallel the major axis "$x$" and which are interconnected at opposite ends by semi-circular continuations of the rim designated 32 and 34 respectively. Thus, body 16 and rim 18 form a shallow inverted dish-like device having a concavity for facing in the direction of the supporting member.

A central hub 36 is positioned co-axially with the body at the intersection of the major and minor axes. Hub 36 may be cylindrical, as shown in the preferred embodiment, and has a diameter approximately equal to the measurement between opposed portions of rim 18 along the minor axis "$y$." It serves to reinforce rim 18 centrally of the two flat sides 28 and 30 and further is the supporting means for stud means 14. A second sealing element 38 extends downwardly, as viewed in the drawing, about the periphery of hub 36. It tapers in an axial direction to its terminal end which is capable of radial distortion when brought into engagement with a supporting surface, for purposes best set forth hereinafter. It should be noted that other geometric configurations are equally acceptable for hub 36.

A plurality of protuberance-like shoulder means or ledges 40 extend outwardly in opposite directions from rim 18. Shoulders 40 each may be generally triangular in configuration as viewed in plan in FIG. 3, with the apex of the most outwardly projecting portion being slightly rounded. The base of the triangular shaped shoulder means and its adjacent apices are extended and curved to blend into the flat sides and curved ends of the rim. In transverse section, as seen in FIG. 4, each of the shoulder means 40 has an upper cam surface 42 extending outwardly and downwardly from a blend into the top of body 16 to its outer extremity 45, and a lower surface 44 extends downwardly and inwardly from its junction at 45 to its termination at a blend into the bottom portion 22 of rim 18. Further details of the structural configuration of shoulder means 40 will be set forth hereinafter.

Extending laterally outwardly from the lower portion 22 of rim 18 are a plurality of spacer flaps 46. Flaps 46 are preferably oppositely disposed in pairs, positioned along the minor axis "$y$," and are of such a width as to be interposed between protuberances 40. Other positions are equally feasible as well as a continuous lateral extension of rim 18, not shown, but a single pair is sufficient to accomplish the padding of the supporting panel during snap engagement of the molding onto the head.

In the preferred embodiment, stud means 14 is shown as a plastic stud, integral with hub 36 and having a plurality of resilient flexible portions separated by slots 48. Stud 14 is further provided with an intermediate shoulder 50 for engagement behind a panel 52 having a complementary aperture 54. While the stud illustrated is functional for maintaining the clip in association with an apertured panel, applicant does not desire to be limited to a specific stud form, since any number of a variety of known stud forms such as shown in Kearns Patent No. 2,402,287 or Rapata Patent No. 2,788,047, to mention but two, would be satisfactory for maintaining the clip in associated relationship with an apertured panel. In operation the clip 10 is moved to telescopically associate stud means 14 with aperture 54 in supporting panel 52. A decorative molding 60 having inwardly turned edges 62 is snapped over the shoulder means 40. As best seen in FIG. 3, the clip head 12 is designed to accept molding 60 by snap engagement. As the edges 62 proceed down cam surfaces 42, the head 12 is distorted by compression along the minor axis "y" to the position shown in phantom in FIG. 3. After the edges 62 have passed over the outer extremities 45 of the shoulder means, the clip will spring outwardly and draw edges 62 of molding 60 down lower cam surfaces 44 until the edges 62 and their associated flanges rest on spacer flaps 46.

The material requirements for this molding clip are basically that the material utilized must be resilient and stretchable when in sheet form, as in body portion 16. Thus, many plastic materials such as nylon, polypropylene, polyethylene and polycarbonate, to mention but a few, are acceptable. The preferred mode of fabrication is by injection molding wherein well known methods make the production of such a clip virtually fully automatic.

In the automotive industry, it is often desirable from an aesthetic standpoint to provide moldings of differing widths at various locations on an automobile. These differing widths generally result in the necessity of maintaining a multiple inventory of clips to accept such moldings. This embodiment of the present invention, however, because of its resilient charcteristics permits the same clip to be utilized with two or more variations of molding sizes within the resilient tolerances of the clip. As can be seen in FIG. 3, the compression of protuberances 40 within the inturned edges 62 results in an elongation of the clip head along the major axis "x" while reducing its dimension as measured along the minor axis "y." Further, the preferred embodiment is provided with two opposed pairs of shoulder means 40 so that the clip is assymmetrical about both the major and minor axes. The spaced relation of shoulder means 40 produces a positive control in the engagement of the molding with the supporting surface. This factor of controlled retention remains throughout the entire range of positions which the head is capable of assuming, from its initial molded position to its position under full compression.

Referring now to a further embodiment of the invention, as seen in FIGS. 5 and 6, wherein similar parts are provided with similar numerals with addition of the suffix "a." In this embodiment the clip is provided with an oval body 16a and a depending tapering rim 18a substantially identical to the first mentioned embodiment. The slope of the upper portion of the outer surface 20a of rim 18a is continued all the way to the bottom and hence the head 12a presents a frusto-conical appearance in elevation, as best seen in FIG. 5. The protuberances 40a in this embodiment are developed in plan on a segment of arc 66 having a radius of curvature substantially greater than the radius of curvature of the semi-circular ends 32a and 34a of the rim 18a. This configuration of protuberance provides a "bow-tie" like appearance in plan, with a line-like cam surface 68 in place of the more rounded surface 40 of the first embodiment. The lower cam surface 70 is similar in concept and design to the cam surface 44 of the first embodiment.

A further difference exists in this embodiment in that the stud means is a screw threaded member 72 passing through a bore 74 in hub 36a for securing the head 12a to a cooperative supporting member. The operation of head 12a is substantially identical to the basic embodiment in that it will distort by elongation along its major axis so as to permit the cam surfaces 68 and 70 to spring back for cooperative engagement with the inturned flanges of a molding strip.

FIGS. 7 through 10 are disclosures of varying forms of protuberance or shoulder means 40. The other elements of the clip are construed to be essentially the same and shall not be discussed. Similar numerals shall be used to designate similar parts with the addition of the suffixes "b" through "e" for the respective figures. In FIG. 7 the protuberance 40b is essentially a non-regular pyramid having dissimilar lengths along lateral edges 76 and 78 to provide a vertex 80 serving as the outwardly extending point of the protuberance.

In FIG. 8 the shoulder means 40c forms an angle "a" between its outermost extremity 45c and the vertical flat side 28c of the skirt. The lower cam surface 44c forms varying angles with the flat side 28c, such as indicated angles "b" and "c" when the transverse sections are measured progressively along the major axis "x." This provides a smooth blend line 82 at the juncture of lower cam surface 44d with rim 18c.

In FIG. 9, angle "d" formed between the extremity 45d of shoulder means 40d and rim 18d may be similar to angle "a." The lower cam surface 44d forms a substantially constant angle "e" with skirt 18d. Geometrically accomplish this it is necessary to provide a developed or curved juncture line 84 between lower cam surface 44d and rim 18d, the lower cam surface 44d being generally semi-teardrop in configuration.

The protuberance 40e of FIG. 10 is basically related to the protuberance 40b of FIG. 7 in that it is a non-regular pyramid but has one face 86 curved to blend in with the semi-circular end 32e while the vertex 80e and one face forming lower cam surface 44e serve to retain the molding.

A further embodiment of the invention is shown in FIG. 11 wherein similar numerals will be utilized to indicate similar parts with the addition of the suffix "f." In this embodiment the body 16f is substantially hexagonal in shape and is provided with a depending rim 18f. The opposed protuberances 40f are positioned centrally on the flat sides 28f and 30f respectively. The spacing flaps 46f are multiple in number and are positioned adjacent the end of the clip, with the protuberances being intermediate the spacing flaps, or the converse of the first embodiment. Any suitable stud means can be utilized with hub 36f to associate the clip with an apertured support, as was shown in the other embodiments. Application of the inturned edges of a decorative molding results in a distortion of this clip and associated spacer flaps to the position shown in phantom.

When a screw threaded member is utilized with any embodiment of this invention there are some instances when it would be desirable to apply the screw threaded member from the blind side of the panel. Such a problem is handled by the embodiment shown in FIG. 12 wherein similar numerals are utilized to indicate similar parts with the addition of the suffix "g." In this embodiment the hub 36g is extended axially so that it will project downwardly beyond the planar limits of sealing surface 26g. When head 12g is associated with a complementary panel 52g, hub 36g extends through the aperture 54g in the panel beyond the opposite or blind side of the panel. Screw means, such as complementary thread cutting screw 72g applied from the underside of panel 52g, is accepted within bore 74g of hub 36g. By drawing the screw 72g upwardly within bore 74g the underside of the head of the screw member is brought into engagement with the lowermost portion 90 of hub 36g and radially distorts hub 36g into engagement with the undersurface of the panel. This results in an effective sealing of aperture 54g by said hub 36g. It should be noted that in any application wherein it is desired to electrically insulate a molding from the supporting panel this embodiment would be most effective.

The embodiments set forth hereinabove, for engagement with a molding having inturned flanges, disclose a new principle for a compact economical molding clip. In the structure of protuberances provided in the preferred embodiment the protuberances have their high points closest to the ends of the head, which gives a camming action tending to elongate the rim portions of the clip and to stretch the material forming the body portion. Since the materials utilized, namely resilient plastics, have certain inherent strength characteristics, this clip will effectively maintain a decorative molding in close proximity to a supporting panel. In addition, the resiliency of the material permits distortion of the sealing surfaces when in engagement with a panel to effectively seal the underside of the panel from the outerside by surrounding the aperture through the panel. When a secondary stud element is utilized, i.e., a screw, the gripping of the screw threads by the plastic material of the head will prevent the egress or passage of water or other fluids through the aperture and also act as a thread lock on the screw, as is well known in the art.

Other embodiments will be apparent to those skilled in the art, but it is my intent to be limited only by the appended claims.

I claim:

1. A one piece plastic molding clip head adapted to engage the inwardly turned flanges of a hollow decorative molding and a stud having means, adapted to retain the molding clip head to an apertured workpiece, said molding clip head including an inverted oblong cup-like member having a substantially continuous depending side wall which at its terminal end presents an edge for engagement with a surface of an apertured workpiece, said side wall extending generally vertically from said edge and thence tapering inwardly to a flat upper outer surface generally coplanar with a plane parallel to a plane passing through said edge, said stud depending from said clip head in the same direction as said side wall for engagement with said apertured workpiece, said stud being spaced radially inwardly from said edge whereby said edge provides substantially tight sealing engagement around said aperture with the surface of said workpiece, and a plurality of oppositely extending protuberance means projecting from said side wall along the major dimension of said oblong cup-like member for engagement with the inwardly turned flanges of said molding to retain same adjacent said workpiece, said protuberance means further being tapered so as to blend into the side wall of said inverted oblong cup-like member, the distance between the outer extremities of opposed pairs of protuberance means being substantially greater than the distance between the inturned flanges of said molding, the upper surface of each of said protuberance means being tapered to provide a cam surface, said side wall of said oblong cup-like member being adapted to flex inwardly when said molding flanges are snapped downwardly over said spaced opposed pairs of said protuberance means and thence to flex outwardly with said protuberance means engaging said flanges to retain the molding adjacent said workpiece.

2. A device of the type claimed in claim 1 wherein the outwardly extending oppositely positioned protuberance means are four in number and are disposed in pairs in spaced relation along the major dimension of said head adjacent opposite ends of said oblong cup-like member.

3. A device of the type claimed in claim 1 wherein said side wall has two opposed parallel flat sides interconnected at opposite ends by semi-circular ends.

4. A device of the type claimed in claim 1 having a pair of opposed tab like portions extending laterally from the bottom edge of the side wall and adapted to prevent said molding from impinging on said work panel when snapped over said shoulder means.

5. A device of the type claimed in claim 1 wherein said stud means is provided with a bore extending substantially throughout its length and is adapted to accept a complementary screw threaded fastener device therein which will facilitate expansion of the stud and engaged relationship with the aperture and workpiece with which it cooperates to retain the molding clip device in assembled relation thereto.

References Cited by the Examiner

UNITED STATES PATENTS 2,521,271  9/50  Wiley.

DONLEY J. STOCKING, *Primary Examiner.*

ABRAHAM G. STONE, *Examiner.*